United States Patent [19]
Ito

[11] Patent Number: 5,644,359
[45] Date of Patent: Jul. 1, 1997

[54] IMAGE INPUT APPARATUS HAVING A WHITE BALANCE CORRECTION MEANS AND A METHOD OF INPUTTING AN IMAGE USING THE IMAGE INPUT APPARATUS

[75] Inventor: Kan Ito, Tokyo, Japan

[73] Assignee: Canon Kabushiki Kaisha, Tokyo, Japan

[21] Appl. No.: 621,721

[22] Filed: Mar. 28, 1996

[30] Foreign Application Priority Data

Apr. 3, 1995 [JP] Japan ................................ 7-077700

[51] Int. Cl.[6] ........................................... H04N 9/73
[52] U.S. Cl. ............................. 348/223; 348/228
[58] Field of Search ............................... 348/223, 224, 348/225, 227, 228; 358/29; H04N 9/73

[56] References Cited

U.S. PATENT DOCUMENTS

5,313,277  5/1994  Suzuki .................... 348/223
5,420,630  5/1995  Takei ...................... 348/223

*Primary Examiner*—Sherrie Hsia
*Attorney, Agent, or Firm*—Fitzpatrick, Cella, Harper & Scinto

[57] ABSTRACT

Method and apparatus for inputting an image includes structure and steps for detecting whether a pick-up mode is a person pick-up mode or a document pick-up mode. Structure and steps are provided for selecting a white balance reference value according to the detected pick-up mode. Structure and steps are also provided for correcting the white balance of the color image using both the selected reference value and color information calculated from the picked-up color image signal.

11 Claims, 9 Drawing Sheets

| R1 B1 YH1 | R9 B9 YH9 | R17 B17 YH17 | R25 B25 YH25 | R33 B33 YH33 | R41 B41 YH41 | R49 B49 YH49 | R57 B57 YH57 |
| --- | --- | --- | --- | --- | --- | --- | --- |
| R2 B2 YH2 | R10 B10 YH10 | R18 B18 YH18 | R26 B26 YH26 | R34 B34 YH34 | R42 B42 YH42 | R50 B50 YH50 | R58 B58 YH58 |
| R3 B3 YH3 | R11 B11 YH11 | R19 B19 YH19 | R27 B27 YH27 | R35 B35 YH35 | R43 B43 YH43 | R51 B51 YH51 | R59 B59 YH59 |
| R4 B4 YH4 | R12 B12 YH12 | R20 B20 YH20 | R28 B28 YH28 | R36 B36 YH36 | R44 B44 YH44 | R52 B52 YH52 | R60 B60 YH60 |
| R5 B5 YH5 | R13 B13 YH13 | R21 B21 YH21 | R29 B29 YH29 | R37 B37 YH37 | R45 B45 YH45 | R53 B53 YH53 | R61 B61 YH61 |
| R6 B6 YH6 | R14 B14 YH14 | R22 B22 YH22 | R30 B30 YH30 | R38 B38 YH38 | R46 B46 YH46 | R54 B54 YH54 | R62 B62 YH62 |
| R7 B7 YH7 | R15 B15 YH15 | R23 B23 YH23 | R31 B31 YH31 | R39 B39 YH39 | R47 B47 YH47 | R55 B55 YH55 | R63 B63 YH63 |
| R8 B8 YH8 | R16 B16 YH16 | R24 B24 YH24 | R32 B32 YH32 | R40 B40 YH40 | R48 B48 YH48 | R56 B56 YH56 | R64 B64 YH64 |

LOW LUMINANCE
PORTION

COLORLESS PORTION
AT HIGH LUMINANCE

IMAGE INPUT APPARATUS HAVING A WHITE BALANCE CORRECTION MEANS AND A METHOD OF INPUTTING AN IMAGE USING THE IMAGE INPUT APPARATUS

BACKGROUND OF THE INVENTION

1. Field of the Invention

The present invention relates to an image input apparatus, and more particularly, to an image input apparatus for images of persons and documents.

2. Description of the Related Art

Recently, with progress in computers and communication technology, the technological base for handling images with computers has expanded, and video cameras have become available as an image input means. For example, according to picture phone and videoconference systems, an image of a speaker or a document (such as a material of the conference) is input and transmitted over a distance to the other party. Since the provision of a separate video camera for the person and for the document represents a substantial cost, a combined use of one video camera for both the person and the document is usually considered.

Figure 1:
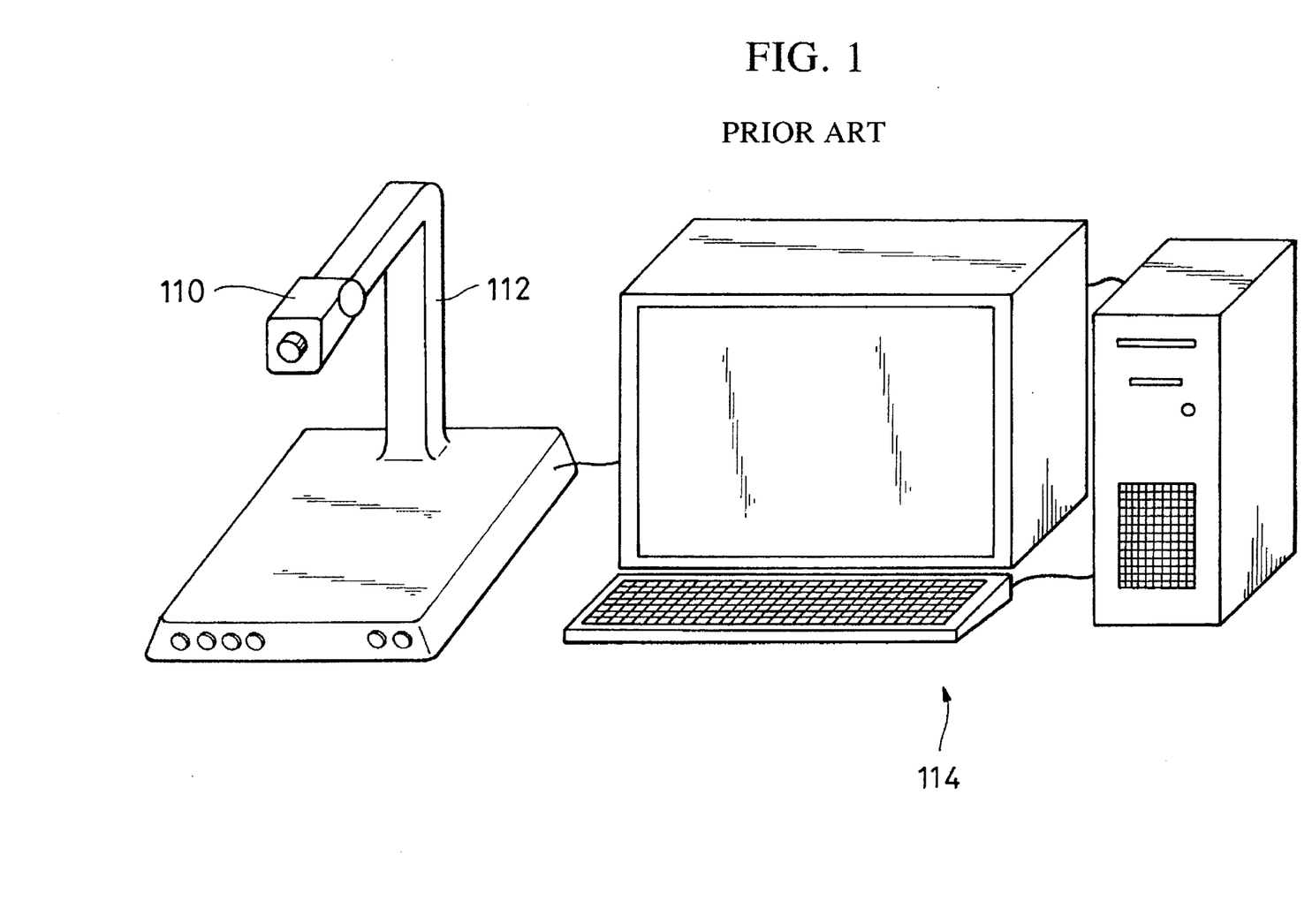
FIG. 1 is an external view of a conventional image input apparatus.

FIG. 1 is an external view of a conventional video camera for images of persons and documents. Referring to FIG. 1, a camera head 110 is supported by a column 112 in such a manner that it can be directed horizontally or vertically downward. Since the camera head is changed between the cases when a person is picked-up and when a document is picked-up, the camera head 110 is provided with a function for changing the vertically downward direction in a picked-up image when, for example, the camera head 110 is directed downward. Outputs of the camera head 110 are supplied to a computer 114, displayed on a monitor screen, and then transmitted to remote areas.

Such image input apparatus and also a common video camera are provided with a correction circuit for automatically correcting a color balance, specifically, a white balance of pick-up images. In order to avoid the adverse influence of objects of different colors, technology is known in which the white balance is corrected by using only a signal from a white object (or of a color approaching white), or a signal having the potential of becoming such a signal (hereinafter, referred to as a white reference signal). For example, this technology is one in which only the white reference signal is extracted from a luminance signal and two types of color difference signals R-Y and B-Y to correct a gain of each color component of the pick-up image in such a manner that the extracted color difference component is allowed to approach zero.

In addition, technology is known in which, when a person is picked-up, the color balance is controlled in accordance with the color temperature of a light source (such as a sunlight, a fluorescent lamp or an incandescent lamp) in such a manner that the extracted color difference signal component is allowed to approach slightly to a warm color (R-Y>0, B-Y<0), thereby faithfully reproducing a realistic image without fading a color of the person's skin.

However, when a video camera provided with the white balance correction circuit adjusted for picking-up the person is used for picking-up the document, the color of the document is reproduced in somewhat reddish hues. Conversely, according to the white balance adjusted for color reproduction of the document, the color of the person's skin is reproduced with a slight fading when the person is picked-up.

SUMMARY OF THE INVENTION

It is an object of the present invention to provide an image input apparatus which enables an optimum white balance correction even when a pick-up mode is changed.

According to an aspect of the invention, there is provided an image input apparatus which comprises: image pick-up means for converting an optical image into an electric signal and outputting a color image signal; calculation means for calculating color information from the color image signal output from the image pick-up means; storage means for storing (i) a first reference value for a white balance correction in a first pick-up mode, and (ii) a second reference value for a white balance correction in a second pick-up mode; selection means for selecting either of the first reference value and second reference value in accordance with the pick-up mode; and correction means for correcting the white balance of the color image signal with the reference value selected in accordance with the pick-up mode and the color information calculated by the calculation means.

According to another aspect of the invention, there is provided a method of inputting an image with an image input apparatus which comprises the steps of: detecting whether a pick-up mode is a person pick-up mode or a document pick-up mode; selecting a reference value for correcting a white balance of a color image signal according to the pick-up mode detected; and correcting the white balance of the color image signal with color information calculated from the color image signal included in an electric signal in which an optical image is converted and the reference value selected.

Further objects, features, and advantages of the present invention will become apparent from the following description of the preferred embodiment with reference to the attached drawings.

DETAILED DESCRIPTION OF THE PREFERRED EMBODIMENT

An embodiment of the present invention will now be described in detail with reference to the accompanying drawings.

Figure 2:
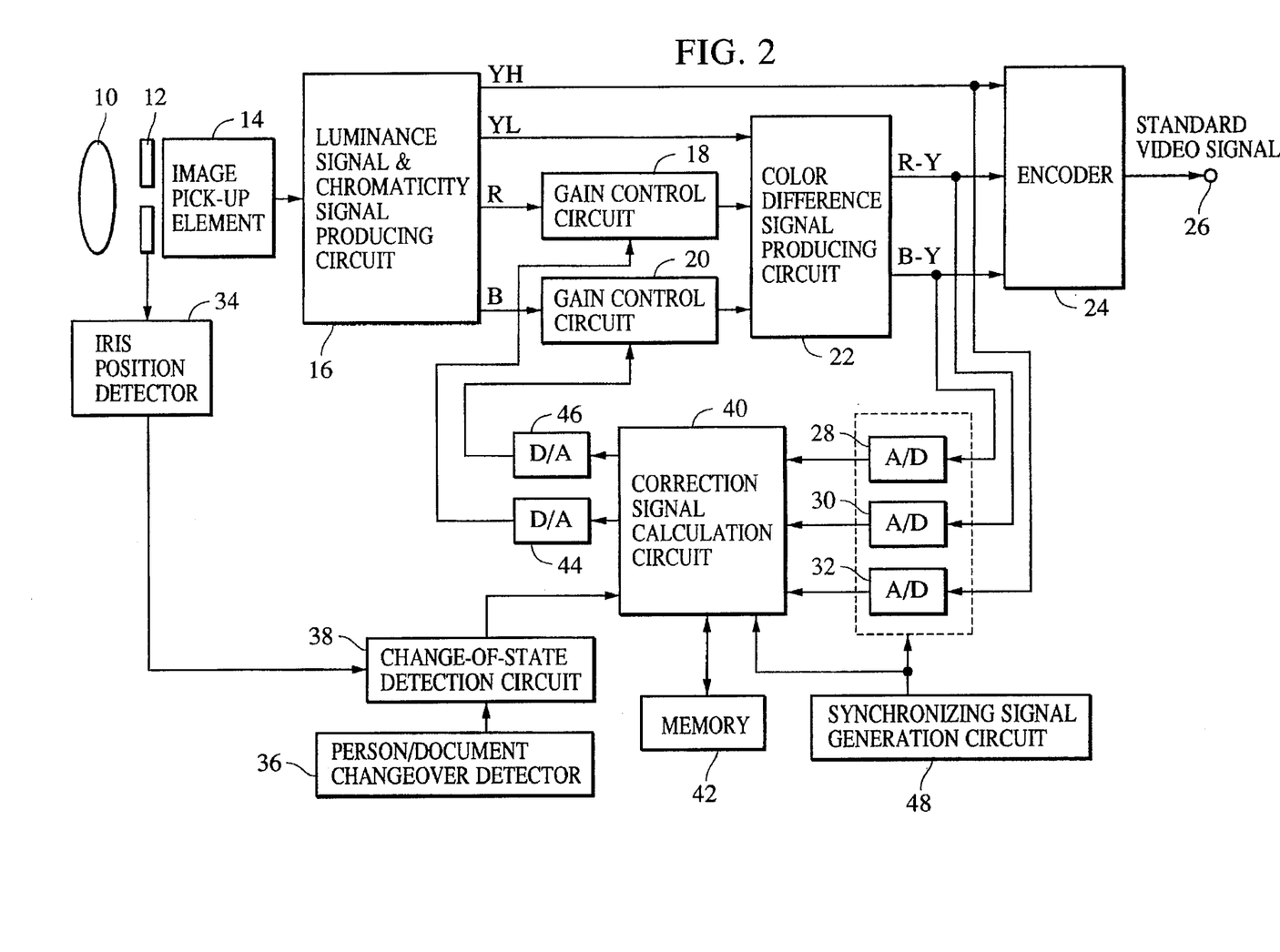
FIG. 2 is a schematic diagram which illustrates an embodiment of the present invention.

FIG. 2 is a schematic block diagram showing an embodiment of the present invention. Referring to FIG. 2, an image pick-up element 14 comprised of a CCD or the like converts optical images (passing through a pick-up lens 10 and an iris 12) into electric signals. A luminance signal and chromaticity signal producing circuit 16 produces a high frequency component YH and a low frequency component YL of a luminance signal, a red signal R and a blue signal B from signals output from the image pick-up element 14. A gain control circuit 18 controls a gain of the signal R from the luminance signal and chromaticity signal producing circuit 16. A gain control circuit 20 controls a gain of the signal B from the luminance signal and chromaticity signal producing circuit 16.

A color difference signal producing circuit 22 produces color difference signals R-Y and B-Y from the signal YL output from the luminance signal and chromaticity signal producing circuit 16 and the outputs of the gain control circuits 18 and 20. A video encoder 24 produces a standard type video signal from the high frequency luminance signal YH output from the luminance signal and chromaticity signal producing circuit 16 and color difference signals R-Y and B-Y output from the color difference signal producing circuit 22. An output-terminal 26 outputs the outputs of the encoder 24.

An A/D converter 28 converts the analog color difference signal B-Y output from the color difference signal producing circuit 22 into a digital signal. An A/D converter 30 converts the analog difference signal R-Y output from the color difference signal producing circuit 22 into a digital signal. An A/D converter 32 converts the analog high frequency luminance signal YH output from the luminance signal and chromaticity signal producing circuit 16 into a digital signal.

An iris position detector 34 is composed of a Hall element for detecting an opening degree of the iris 12, and outputs a high voltage when an aperture is opened and a low voltage when the aperture is closed.

A person/document changeover detector 36 detects whether a person is picked-up, or a document is picked up. For example, the person/document changeover detector 36 detects whether the camera head 110 is directed horizontally or vertically downward when the image input apparatus is constructed as shown in FIG. 1.

Figure 3:
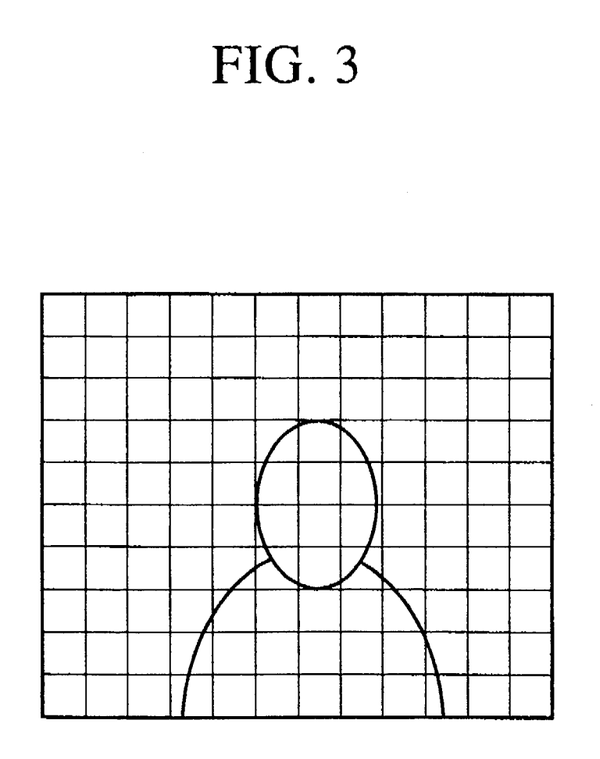
FIG. 3 illustrates an example of a screen when a person is picked-up.
Figure 4:
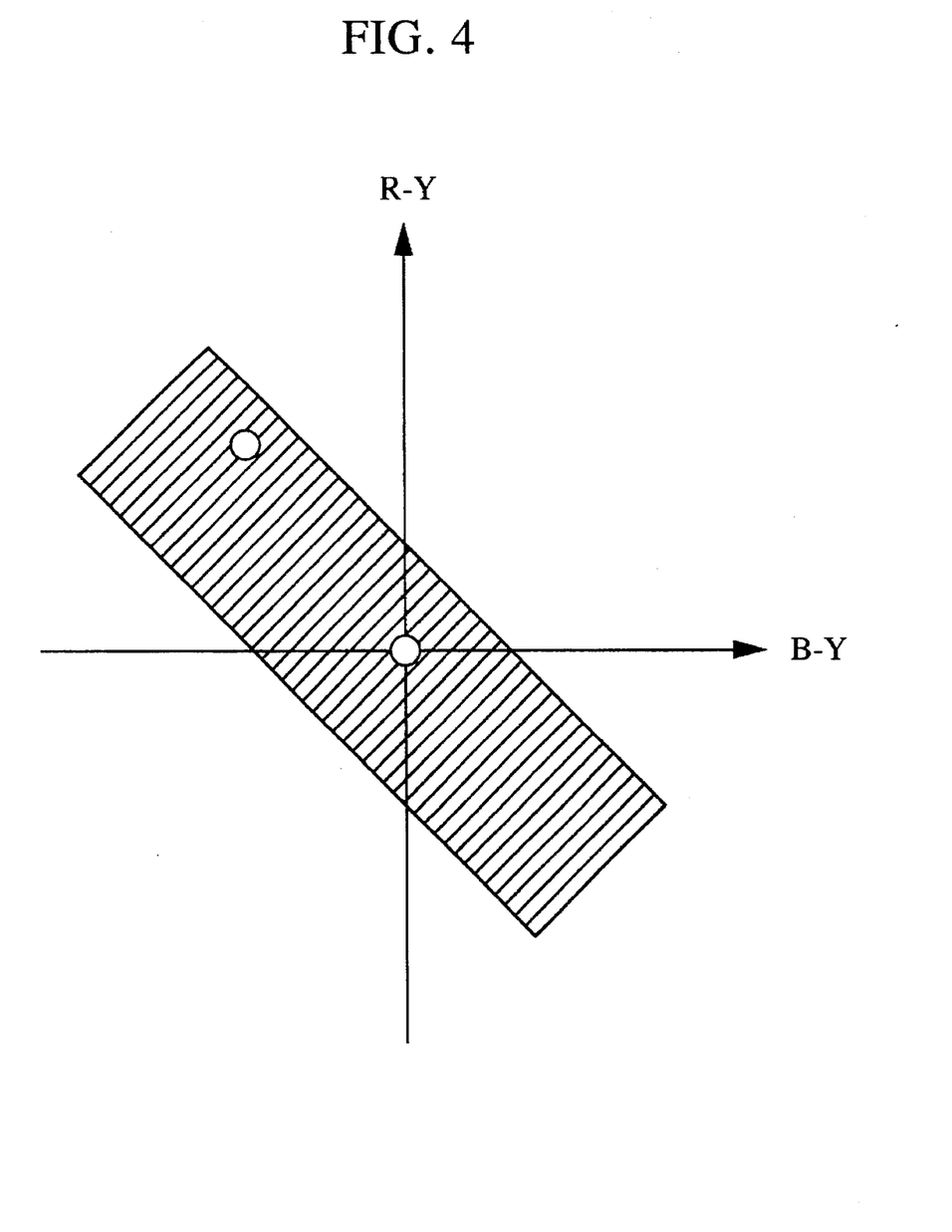
FIG. 4 illustrates an example of a color difference value of a person's skin.

When the person is being picked-up, the face of the person appears on a screen substantially at the center thereof in the vertical direction, as shown in FIG. 3. Thus, by identifying the position of the face of the person, whether or not the person is being picked-up can be detected. By detecting the action of an object at each frame substantially at the center of the screen in the vertical direction, and examining the presence of a color signal corresponding to the color of the person's skin when the action stops, whether the object is the person can be identified. For example, in the case of the yellow race, if the color signal is present within a range of the color difference shown in FIG. 4, it can be regarded as the color of the person's skin. It is a matter of course that racial differences such as the white, yellow and black races should be considered.

A change-of-state detection circuit 38 detects changes of states of the output of the iris position detector 34 and the output of the person/document changeover detector 36, and notifies a correction signal calculation circuit 40 thereof.

A correction signal calculation circuit 40 calculates a control value, i.e. a white balance correction value of the gain control circuits 18 and 20 in accordance with the changes of state of the outputs of the A/D converters 28, 30 and 32, and the change-of-state detection circuit 38. Although details will be described later, the correction signal calculation circuit 40 changes a reference value of the white balance when the person is picked-up and when the document is picked-up, in accordance with the output of the state-of-change detection circuit 38. A memory 42 temporarily stores calculation results and the like of the outputs of the A/D converters 28, 30 and 32 and the correction signal calculation circuit 40 under control of the correction signal calculation circuit 40. The correction signal calculation circuit 40 is composed of, for example, a digital calculation circuit such as a microcomputer.

A D/A converter 44 converts the R gain correction signal output from the correction signal calculation circuit 40 from a digital value to an analog value. A D/A converter 46 converts the B gain correction signal also output from the correction signal calculation circuit 40 from a digital value to an analog value. The outputs of the D/A converters 44 and 46 are applied on gain control terminals of the gain control circuit 18 and 20, respectively.

A synchronizing signal generation circuit 48 generates a signal for synchronizing the A/D converters 28, 30, 32 and the correction signal calculation circuit 40. The synchronizing signal generated from the synchronizing signal generation circuit 40 also synchronizes with the image signal output from the image pick-up element 14.

White balance correction, which is a primary operation of this embodiment, will now be described. The basic operation of the white balance correction will be described in the first place.

Figure 5:
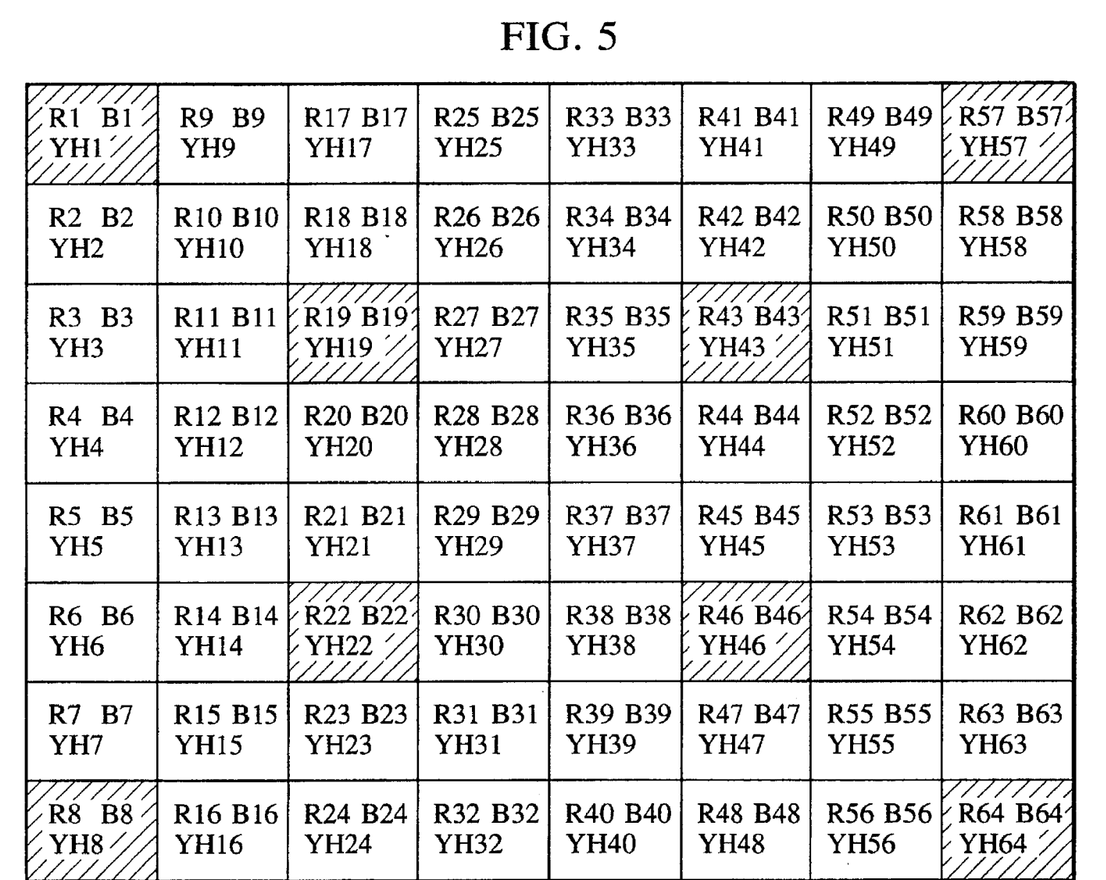
FIG. 5 is a view which illustrates a split screen and data of each of the split areas of an embodiment of the present invention.

In this embodiment, the correction signal calculation circuit 40 splits the outputs of the A/D converters 28, 30 and 32 into a total of 64 areas (8 areas high by 8 areas wide) within one screen, as shown in FIG. 5, in accordance with the synchronizing signal output from the synchronizing signal generation circuit 48. In this embodiment, the correction signal calculation circuit 40 can capture the vertical 8 areas of data per one field. Thus, it requires a period of 8 fields to capture the whole data on the screen. Although a short period of time is required for capturing the whole data on the screen, the white balance can be corrected substantially at a sufficiently high speed even if a period of 8 fields is required as in this embodiment.

Figure 6:
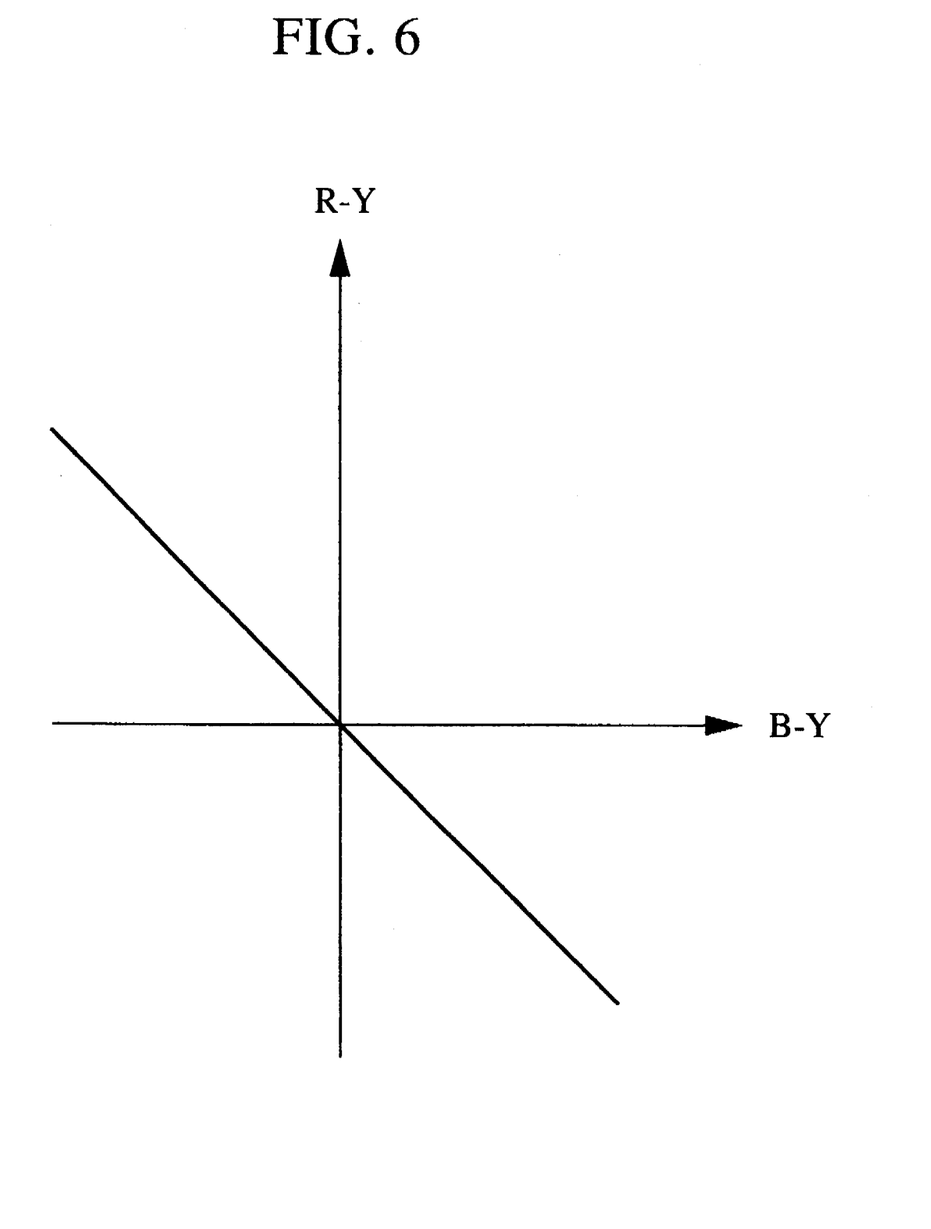
FIG. 6 illustrates a change in color temperature.
Figure 7:
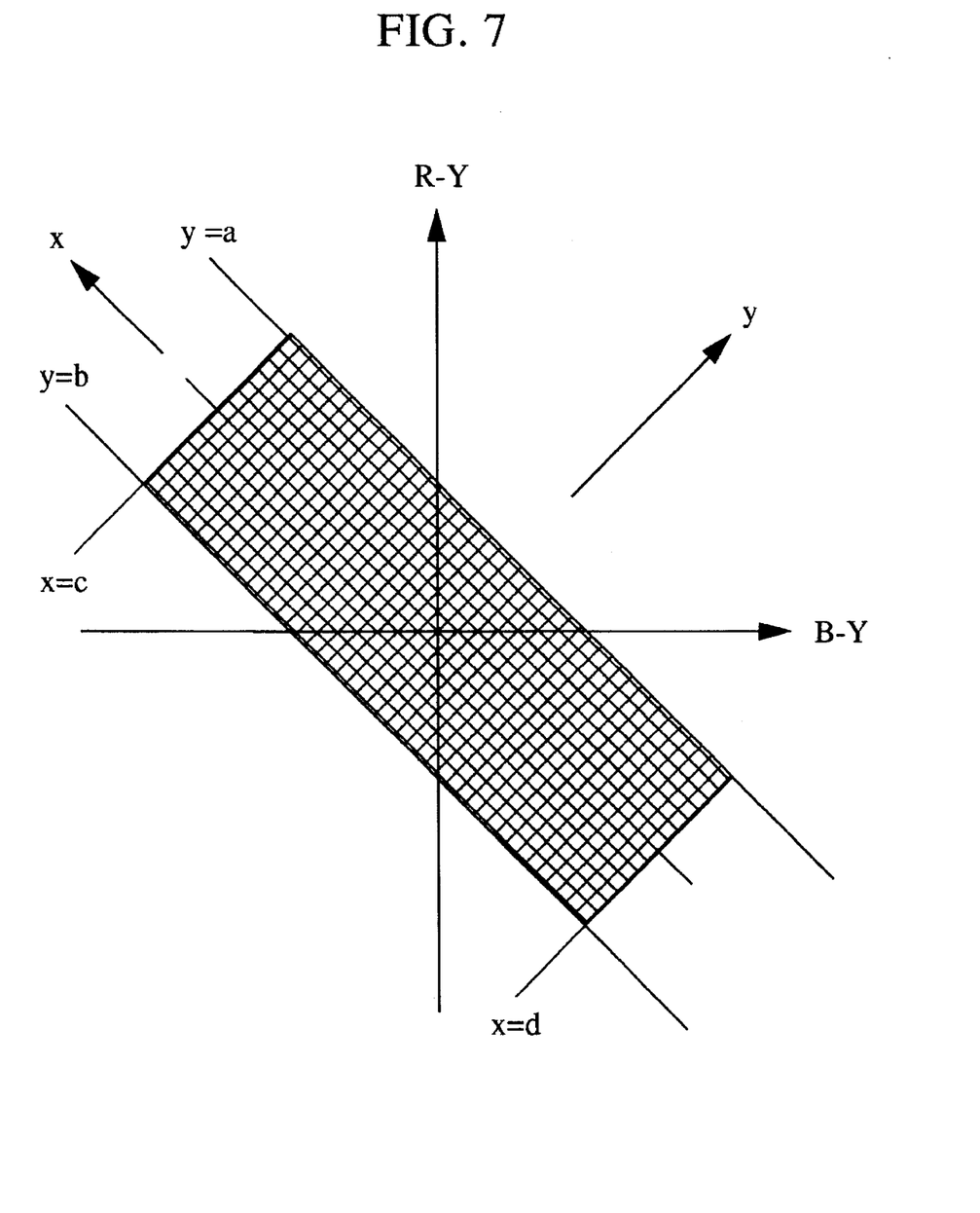
FIG. 7 in an explanatory view of a range in which a signal of a white object is extracted.

The correction signal calculation circuit 40 calculates the averages of the signals B-Y, R-Y and YH with respect to each of the areas and temporarily stores them in the memory 42. As shown in FIG. 5, the averages of the signals B-Y and R-Y in 64 areas are to be represented by Bn (n=1 to 64) and Rn (n=1 to 64), respectively. Signals from a white (or of a color approaching white) object are extracted from these values. In light of color reproduction of the white object associated with a change in color temperature, a range of the change in color temperature will be considered along the straight line shown in FIG. 6. As shown in FIG. 7, the two-dimensional coordinate system (x, y) may be considered in which the signals R-Y and B-Y are synthesized. That is, if we let $$x=(R-Y)-(B-Y)=R-B \tag{1}$$

and $$y=(R-Y)+(B-Y)=R+B-2Y \tag{2}$$

the signals are less affected by the change in color temperature in the y-axis direction, and are merely changed in the x-axis direction according to the change in color temperature.

Figure 8:
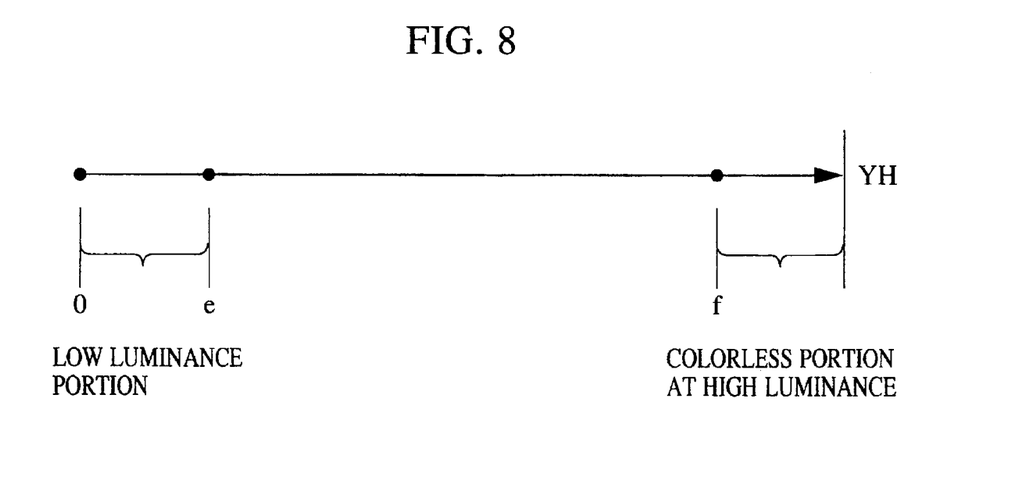
FIG. 8 is an explanatory view of a low luminance portion and a colorless portion at a high luminance.

Thus, as distinguished by hatching in FIG. 7, if only the signals within an area which has a fixed width and extends along the x-axis line are extracted, this will provide extraction of all of the signals from the white or of a color approaching white object. The use of the signals thus extracted achieves a control of the white balance in which the influence of an object of a different color is reduced. Specifically, only the signals having y within the range of $b \leq y \leq a$, and x within the range of $c \leq x \leq d$ in FIG. 7, and YH within the range of $e \leq YH \leq f$ in FIG. 8 are extracted. Here, e is a threshold for removing a low luminance portion, and f is a threshold for removing a colorless portion at a high luminance.

In this way, the averages Ray and Bav of Rn and Bn extracted as white signals from each of the areas splitting one screen are calculated. When determining these averages Rav and Bav, Rn and Bn may be previously removed if they are zero. In this case, Rn and Bn may be used as a basis for calculating the averages unless either one is zero. Of course, Rn and Bn obtained from all of the 64 areas may be added and divided by the number of the areas of 64. This method simplifies the calculation, but results in somewhat poor color reproduction.

The correction signal calculation circuit 40 compares the thus obtained averages Rav and Bav with the reference potentials (reference values) Rref and Bref, which are equivalent to the averages of the signals having good white balance, to calculate correction data of the R signal and the B signal such that Rav is equal to Rref and Bav is equal to Bref. The calculated R correction data and B correction data are converted by the D/A converter 44 and 66 into analog signals, respectively, and applied on the control terminals of the gain control circuits 18 and 20 to control gains in the circuits 18 and 20. In this way, the gains of the R signal and B signal output from the luminance signal and chromaticity signal producing circuit 16 are automatically controlled to obtain a desired color balance.

In this embodiment, the correction signal calculation circuit 40 stores two values for each color R and B, i.e. Rref(1), Bref(1) and Rref(2), Bref(2) as reference values (or desired values) of the white valance. The change-of-state detection circuit 38 detects a change of the pick-up condition from the outputs of the person/document changeover detector 36 (i.e. signals showing whether a person is being picked-up or a document is being picked-up) and the signal of the iris position detector 34 detecting a change in luminance of a pick-up screen, and notifies the correction signal calculation circuit 40 of the detection results. The circuit 40 employs the reference values Rref(1) and Bref(1) as the reference values Rref and Bref of the white balance when the person is picked-up, while employs the reference values Rref(2) and Bref(2) when the document is picked-up.

Figure 9:
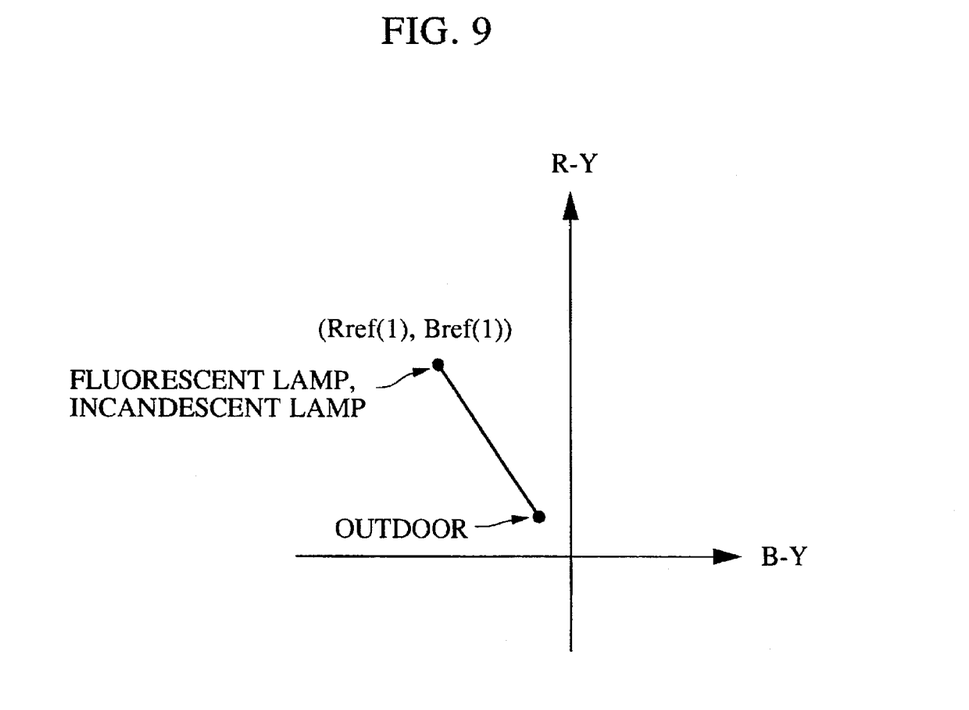
FIG. 9 illustrates a reference value of a white balance when a person is picked-up.
Figure 10:
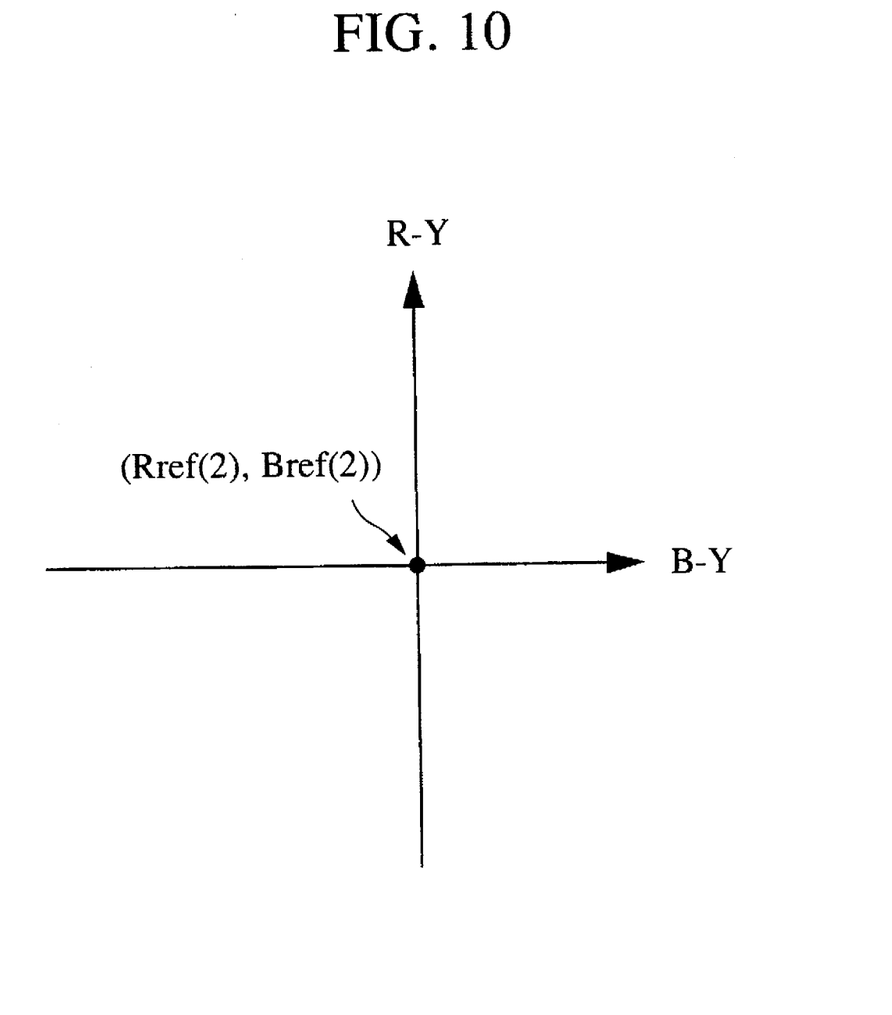
FIG. 10 illustrates a reference value of a white balance when a document is picked-up.

FIG. 9 shows the reference values Rref(1) and Bref(1), and FIG. 10 shows the reference values Rref(2) and Bref(2). When the person is picked-up, the reference values Rref(1) and Bref(1) are changed linearly according to the color temperature of a light source. That is, when the light source is an artificial light such as an incandescent lamp or a fluorescent lamp, an image of the object is made to appear in a color to which a slight amount of orange is added, while an image of the object is made to appear in a color approaching white when the light source is an outdoor natural light. This enables a color of the person's skin to be reproduced in a natural state without fading. When the color of the person's skin is considered as described above, a plurality of line segments of the reference values Rref(1) and Bref(1) shown in FIG. 9 are prepared in accordance with the color of the person's skin. The reference values Rref(1) and Bref(1) can be stored as line segments shown in FIG. 9 and a plurality of spots (numerical values). When the document is picked-up, the reference values Rref(2) and Bref(2) are allowed to completely match the center point, as shown in FIG. 10 so that characters and pictures written on the document can be clearly displayed.

As will be understood easily from the foregoing description, according to this embodiment, since suitable values are employed as the reference values of the white balance when the person is picked-up and when the document is picked-up, respectively, it is possible to reproduce the color of the person's skin in a natural state when picking-up the person, and reproduce a white color faithfully when picking-up the document. Therefore, the image input apparatus according to this embodiment can achieve a suitable color reproduction when picking-up both of the person and document, as the image input apparatus for images of persons and documents.

This embodiment uses the hardware configuration as shown in block diagram of FIG. 2. However, an image input apparatus according to the present invention can also be implemented in a software method in which the CPU performs the desired processing with a program stored in a storage means (memory).

The individual components shown in outline or designated by blocks in the Drawings are well-known in the image processing arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image input apparatus, comprising:

image pick-up means for converting an optical image into an electric signal and outputting a color image signal;

calculation means for calculating color information from the color image signal output from said image pick-up means;

storage means for storing one or more first reference values for a white balance correction in a first pick-up mode, and one or more second, different, reference values for a white balance correction in a second pick-up mode;

determining means for determining whether said apparatus is in the first pick-up mode or the second pick-up mode;

selection means for selecting one of said first reference values and said second reference values in accordance with the determined pick-up mode; and correction means for correcting the white balance of the color image signal with the selected reference value and the color information calculated by said calculation means.

2. An image input apparatus according to claim 1, wherein the first pick-up mode comprises a person pick-up mode and the second pick-up mode comprises a document pick-up mode.

3. An image input apparatus according to claim 2, further comprising detection means for detecting whether the apparatus is in the person pick-up mode or the document pick-up mode.

4. An image input apparatus according to claim 3, wherein said detection means detects a changeover of an image pick-up direction of said image pick-up means between said person pick-up mode and said document pick-up mode.

5. An image input apparatus according to claim 2, wherein said storage means stores a plurality of the first reference values.

6. An image input apparatus according to claim 5, wherein the first reference values stored in said storage means vary in accordance with a color temperature of a light source.

7. An image input apparatus according to claim 5, wherein the first reference values stored in said storage means vary in accordance with a color of a person's skin.

8. An image input apparatus according to claim 1, further comprising detection means for detecting whether said apparatus is in the first pick-up mode or the second pick-up mode.

9. A method of inputting an image with an image input apparatus which receives an optical image, converts the optical image to an electrical signal, and calculates color information therefrom, comprising the steps of:

detecting whether a pick-up mode is a person pick-up mode or a document pick-up mode;

selecting a reference value for correcting a white balance of a color image signal according to the pick-up mode detected, a reference value for the person pick-up mode being different from a reference value for the document pick-up mode; and correcting the white balance of the color image signal with the color information calculated from the color image signal and the reference value selected.

10. A method of inputting an image according to claim 9, wherein during said selecting step the reference value is further selected in accordance with a color temperature of a light source.

11. A method of inputting an image according to claim 9, wherein during said selecting step the reference value is further selected in accordance with a color of a person's skin.

* * * * *